US006521004B1

(12) United States Patent
Culler et al.

(10) Patent No.: US 6,521,004 B1
(45) Date of Patent: *Feb. 18, 2003

(54) METHOD OF MAKING AN ABRASIVE AGGLOMERATE PARTICLE

(75) Inventors: Scott R. Culler, Burnsville, MN (US); James L. McArdle, Stillwater, MN (US); Jeffrey W. Nelson, Bayport, MN (US); John T. Wallace, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 30 days.

This patent is subject to a terminal disclaimer.

(21) Appl. No.: 09/688,444

(22) Filed: Oct. 16, 2000

(51) Int. Cl.⁷ .............................. C09K 3/14; B24D 3/02; B24D 3/28
(52) U.S. Cl. .............................. 51/298; 51/307; 51/308; 51/309; 51/293; 23/313 R; 264/117; 264/460; 264/461; 264/462; 264/638
(58) Field of Search .......................... 51/298, 307, 308, 51/309, 293; 23/313 R; 264/118, 143, 142, 460, 461, 462, 638, 639, 655, 660, 681, 117

(56) References Cited

U.S. PATENT DOCUMENTS

| | | |
|---|---|---|
| 1,910,444 A | 5/1933 | Nicholson |
| 2,194,472 A | 3/1940 | Jackson |
| 2,216,728 A | 10/1940 | Benner et al. |
| 2,768,087 A | 10/1956 | Bird |
| 2,958,593 A | 11/1960 | Hoover et al. |
| 3,041,156 A | 6/1962 | Rowse et al. |
| 3,079,243 A | 2/1963 | Ueltz |
| 3,491,491 A | 1/1970 | Ueltz |
| 3,491,492 A | 1/1970 | Ueltz |
| 3,637,360 A | 1/1972 | Ueltz et al. |
| 3,693,893 A | 9/1972 | McIntyre |
| 3,781,172 A | 12/1973 | Pett et al. |
| 3,828,801 A | 8/1974 | Merrill |
| 3,864,101 A | 2/1975 | Charvat |
| 3,891,408 A | 6/1975 | Rowse et al. |
| 3,893,826 A | 7/1975 | Quinan et al. |
| 3,911,202 A | 10/1975 | Stine et al. |
| 3,916,584 A | 11/1975 | Howard et al. |
| 3,924,023 A | 12/1975 | Boranian et al. |
| 3,928,949 A | 12/1975 | Wagner |
| 3,955,942 A | * 5/1976 | Cordon et al. ............... 51/295 |
| 3,990,479 A | 11/1976 | Stine et al. |
| 4,045,416 A | 8/1977 | Robson et al. |
| 4,065,407 A | 12/1977 | Bambrick |
| 4,073,096 A | 2/1978 | Ueltz et al. |
| 4,126,429 A | 11/1978 | Watson |
| 4,132,533 A | 1/1979 | Löhmer et al. |
| 4,194,887 A | 3/1980 | Ueltz et al. |
| 4,227,350 A | 10/1980 | Fitzer |
| 4,252,544 A | 2/1981 | Takahashi |
| 4,305,898 A | 12/1981 | Obersby |
| 4,311,489 A | 1/1982 | Kressner |
| 4,314,827 A | 2/1982 | Leitheiser et al. |
| 4,318,766 A | 3/1982 | Smith |
| 4,364,746 A | 12/1982 | Bitzer et al. |
| 4,364,877 A | 12/1982 | Clément et al. |
| 4,393,021 A | 7/1983 | Eisenberg et al. |
| 4,456,498 A | 6/1984 | Churchland |
| 4,457,767 A | 7/1984 | Poon et al. |
| 4,518,397 A | 5/1985 | Leitheiser et al. |
| 4,541,842 A | 9/1985 | Rostoker |
| 4,543,107 A | 9/1985 | Rue |
| 4,575,384 A | 3/1986 | Licht et al. |
| 4,588,419 A | 5/1986 | Caul et al. |
| 4,611,766 A | 9/1986 | Seifert |
| 4,623,364 A | 11/1986 | Cottringer et al. |
| 4,652,274 A | 3/1987 | Boettcher et al. |
| 4,652,275 A | 3/1987 | Bloecher et al. |
| 4,734,104 A | 3/1988 | Broberg |
| 4,735,632 A | 4/1988 | Oxman et al. |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Hälg et al. |
| 4,751,138 A | 6/1988 | Tumey et al. |
| 4,751,743 A | 6/1988 | Ishino |
| 4,759,507 A | 7/1988 | Lynch et al. |
| 4,768,722 A | 9/1988 | Lynch et al. |
| 4,770,671 A | 9/1988 | Monroe et al. |
| 4,773,599 A | 9/1988 | Lynch et al. |
| 4,789,507 A | 12/1988 | Wesley et al. |
| 4,799,939 A | 1/1989 | Bloecher et al. |
| 4,800,685 A | 1/1989 | Haynes, Jr. |
| 4,814,029 A | 3/1989 | Butcher |
| 4,816,298 A | 3/1989 | Alderman et al. |
| 4,826,799 A | 5/1989 | Cheng et al. |
| 4,840,809 A | 6/1989 | Hsu |
| 4,848,041 A | 7/1989 | Kruschke |
| 4,881,951 A | 11/1989 | Wood et al. |
| 4,895,994 A | 1/1990 | Cheng et al. |

(List continued on next page.)

FOREIGN PATENT DOCUMENTS

| | | |
|---|---|---|
| EP | 0 109 581 | 5/1984 |
| EP | 0 306 161 | 3/1989 |
| EP | 0 306 162 | 3/1989 |

(List continued on next page.)

OTHER PUBLICATIONS

P. Lafferty, The Dictionary of Science, Simon & Schuster, NY, p. 386 (1993) No month.

(List continued on next page.)

Primary Examiner—Michael Marcheschi
(74) Attorney, Agent, or Firm—Bradford B. Wright (57) ABSTRACT

A method for making abrasive agglomerate particles from a composition comprising at least a radiation curable binder and solid particulates. The method comprises the steps of forcing the composition through a perforated substrate to form agglomerate precursor particles which then separate from the perforated substrate. Then, the particles are irradiated to form soldified, handleable agglomerate particles before being collected.

23 Claims, 3 Drawing Sheets

U.S. PATENT DOCUMENTS

| | | |
|---|---|---|
| 4,898,597 A | 2/1990 | Hay et al. |
| 4,900,698 A | 2/1990 | Lundsager |
| 4,903,440 A | 2/1990 | Larson et al. |
| 4,903,444 A | 2/1990 | Berndt, Jr. |
| 4,951,427 A | 8/1990 | St. Pierre |
| 4,954,060 A | 9/1990 | Hsu |
| 4,960,441 A | 10/1990 | Pellow et al. |
| 4,964,883 A | 10/1990 | Morris et al. |
| 4,985,340 A | 1/1991 | Palazzotto et al. |
| 4,989,597 A | 2/1991 | Werner |
| 4,997,461 A | 3/1991 | Markhoff-Matheny |
| 5,009,675 A | 4/1991 | Kunz et al. |
| 5,009,676 A | 4/1991 | Rue et al. |
| 5,011,508 A | 4/1991 | Wald et al. |
| 5,038,453 A | 8/1991 | Kurita et al. |
| 5,039,311 A | 8/1991 | Bloecher |
| 5,042,991 A | 8/1991 | Kunz et al. |
| 5,051,200 A | 9/1991 | Srail et al. |
| 5,078,596 A | 1/1992 | Carberry et al. |
| 5,089,536 A | 2/1992 | Palazzotto |
| 5,090,968 A | 2/1992 | Pellow |
| 5,094,672 A | 3/1992 | Giles, Jr. et al. |
| 5,095,665 A | 3/1992 | Nagata et al. |
| 5,096,465 A | 3/1992 | Chen et al. |
| 5,110,332 A | 5/1992 | Isaksson |
| 5,118,326 A | 6/1992 | Lee et al. |
| 5,131,923 A | 7/1992 | Markhoff-Matheny et al. |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,160,509 A | 11/1992 | Carman et al. |
| 5,164,348 A | 11/1992 | Wood |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,219,806 A | 6/1993 | Wood |
| 5,236,472 A | 8/1993 | Kirk et al. |
| 5,261,612 A | 11/1993 | Ftaiha |
| 5,282,875 A | 2/1994 | Wood et al. |
| 5,300,129 A | 4/1994 | Clark |
| 5,318,604 A | 6/1994 | Gorsuch et al. |
| 5,318,605 A | 6/1994 | Carman |
| 5,330,113 A | 7/1994 | Poser et al. |
| 5,360,587 A | 11/1994 | Brotz et al. |
| 5,366,523 A | 11/1994 | Rowenhorst et al. |
| 5,378,251 A | 1/1995 | Culler et al. |
| 5,417,726 A | 5/1995 | Stout et al. |
| 5,418,369 A | 5/1995 | Moore et al. |
| 5,427,595 A | 6/1995 | Pihl et al. |
| 5,429,647 A | 7/1995 | Larmie |
| 5,436,063 A | 7/1995 | Follett et al. |
| 5,443,906 A | 8/1995 | Pihl et al. |
| 5,454,750 A | 10/1995 | Cosmano et al. |
| 5,489,204 A | 2/1996 | Conwell et al. |
| 5,496,386 A | 3/1996 | Broberg et al. |
| 5,496,387 A | 3/1996 | Culler |
| 5,498,268 A | 3/1996 | Gagliardi et al. |
| 5,498,269 A | 3/1996 | Larmie |
| 5,500,273 A | 3/1996 | Holmes et al. |
| 5,520,711 A | 5/1996 | Helmin |
| 5,534,470 A | 7/1996 | Andrus et al. |
| 5,547,479 A | 8/1996 | Conwell et al. |
| 5,549,962 A | 8/1996 | Holmes et al. |
| 5,551,963 A | 9/1996 | Larmie |
| 5,578,098 A | 11/1996 | Gagliardi et al. |
| 5,593,467 A | 1/1997 | Monroe |
| 5,609,706 A | 3/1997 | Benedict et al. |
| 5,611,829 A | 3/1997 | Monroe et al. |
| 5,628,952 A | 5/1997 | Holmes et al. |
| 5,645,618 A | 7/1997 | Monroe et al. |
| 5,645,619 A | 7/1997 | Erickson et al. |
| 5,649,984 A | 7/1997 | Sigalas et al. |
| 5,651,801 A | 7/1997 | Monroe et al. |
| 5,669,941 A | 9/1997 | Peterson |
| 5,679,067 A | 10/1997 | Johnson et al. |
| 5,690,705 A | 11/1997 | Holmes et al. |
| 5,714,259 A | 2/1998 | Holmes et al. |
| 5,725,162 A | 3/1998 | Garg et al. |
| 5,738,696 A | 4/1998 | Wu |
| 5,738,697 A | 4/1998 | Wu et al. |
| 5,776,214 A | 7/1998 | Wood |
| 5,779,743 A | 7/1998 | Wood |
| 5,830,548 A | 11/1998 | Andersen et al. |
| 5,840,405 A | 11/1998 | Shusta et al. |
| 5,855,632 A | 1/1999 | Stoetzel et al. |
| 5,863,308 A | 1/1999 | Qi et al. |
| 5,893,935 A | 4/1999 | Wood |
| 5,903,951 A | 5/1999 | Ionta et al. |
| 5,908,477 A | 6/1999 | Harmer et al. |
| 5,908,478 A | 6/1999 | Wood |
| 5,914,356 A | 6/1999 | Erbe |
| 5,942,015 A | 8/1999 | Culler et al. |
| 5,954,844 A | 9/1999 | Law et al. |
| 5,961,674 A | 10/1999 | Gagliardi et al. |
| 5,975,988 A | 11/1999 | Christianson |
| 5,997,461 A | 12/1999 | Armington et al. |
| 6,013,222 A | 1/2000 | Douglas et al. |
| 6,054,093 A | 4/2000 | Torre, Jr. et al. |
| 6,056,794 A | 5/2000 | Stoetzel et al. |
| 6,228,133 B1 | 5/2001 | Thurber et al. |
| 6,319,108 B1 | 11/2001 | Adefris et al. |

FOREIGN PATENT DOCUMENTS

| | | |
|---|---|---|
| EP | 0 306 162 B1 | 10/1995 |
| EP | 0 709 347 A | 5/1996 |
| JP | 52-27394 | 3/1977 |
| JP | 53-41833 | 11/1978 |
| JP | 62-136373 | 6/1987 |
| JP | 3-161273 | 7/1991 |
| JP | 3-281174 | 12/1991 |
| RU | 2064941 | 8/1996 |
| SU | 933431 | 6/1982 |
| SU | 1555117 | 4/1990 |
| WO | WO 97/21531 | 6/1997 |
| WO | WO 98/04386 | 2/1998 |
| WO | WO 98/58769 | 12/1998 |
| WO | WO 99/56914 | 11/1999 |

OTHER PUBLICATIONS

E. Matijevic et al., Ferric Hydrous Oxide Sols, vol. 63, Journal of Colloid and Interface Science, pp. 509–524 (1978) No month.

R. K. McGeary, Mechanical Packing of Spherical Particles, vol. 44, No. 10, Journal of the American Ceramic Society, pp. 513–522 (Oct. 1961).

T. Misawa et al., The Mechanism of Formation of Iron Oxide and Oxyhydroxides in Aqueous Solutions at Room Temperature, vol. 14, Corrosion Science, pp. 131–149 (1974) No month.

R.N. Sylva, The Hydrolysis of Iron (III), vol. 22, Review of Pure and Applied Chemistry, pp. 115–132 (1972) No month.

B. Voight et al., Formation of Pure Haematite by Hydrolysis of Iron (III) Salt Solutions Under Hydrothermal Conditions, vol. 21, Crystal Research and Technology, pp. 1177–1183 (1986) No month.

R.C. Weast, Handbook of Chemistry and Physics, p. F–22 (1975–1976), CRC Press, Cleveland, OH No month.

Pending U.S. Patent Application Ser. No. 09/688,486, filed Oct. 16, 2000.

* cited by examiner

METHOD OF MAKING AN ABRASIVE AGGLOMERATE PARTICLE

BACKGROUND OF THE INVENTION

This invention relates to a method for making abrasive agglomerate particles comprising a binder and abrasive grains. The abrasive agglomerate particles made by the present invention can be used in abrasive products such as, for example, coated abrasives, bonded abrasives and nonwoven abrasives.

In the abrasives industry, conventional coated abrasive articles typically consist of a layer of abrasive grains adhered to a backing. When abrasive grains are worn the resulting abrasive article is rendered inoperable and the backing, one of the more expensive components of the coated abrasive article, must be disposed of before it has worn out.

Many attempts have been made to distribute the abrasive grains on the backing in such a manner so that the abrasive grains are better utilized, in order to extend the useful life of the coated abrasive article. By extending the life of the coated abrasive article, fewer belt or disc changes are required, thereby saving time and reducing labor costs. Merely depositing a thick layer of abrasive grains on the backing will not solve the problem, because grains lying below the topmost grains are not likely to be used.

Several methods whereby abrasive grains can be distributed in a coated abrasive article in such a way as to prolong the life of the article are known. One such way involves incorporating abrasive agglomerate particles in the coated abrasive article. Abrasive agglomerate particles consist of abrasive grains bonded together by means of a binder to form a mass. The use of abrasive agglomerate particles with the surface having random shapes and sizes makes it difficult to predictably control the quantity of abrasive grains that come into contact of a workpiece. For this reason, it would be desirable to have an economical way to prepare abrasive agglomerate particles.

SUMMARY OF THE INVENTION

The present invention involves a method for making abrasive agglomerate particles from a composition comprising at least a radiation curable binder and abrasive grains. In a preferred embodiment, the binder is radiation curable and polymerizable.

The method of the present invention involves forming abrasive agglomerate precursor particles and curing them. In a preferred embodiment, the first step involves forcing the binder precursor and abrasive grains through a perforated substrate to form abrasive agglomerate precursor particles. Next, the abrasive agglomerate precursor particles are separated from the perforated substrate and irradiated with radiation energy to provide abrasive agglomerate particles. In a preferred embodiment, the method of forcing, separating and irradiating steps are spatially oriented in a vertical and consecutive manner, and are performed in a sequential and continuous manner. Preferably, the abrasive agglomerate particles are solidified and handleable after the irradiation step and before being collected.

Binder precursors of the present invention include thermal and radiation curable binders. Preferable binder precursors comprise epoxy resins, acrylated urethane resins, acrylated epoxy resins, ethylenically unsaturated resins, aminoplast resins having pendant unsaturated carbonyl groups, isocyanurate derivatives having at least one pendant acrylate group, isocyanate derivatives having at least one pendant acrylate group or combinations thereof. Preferred abrasive grains comprise fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli or combinations thereof. In one embodiment, the abrasive grains are from 5% to 95%, by weight, of the agglomerate composition. In a preferred embodiment, the abrasive grains are from 40% to 95%, by weight, of the agglomerate composition.

The agglomerate composition of binder precursor and abrasive grains preferably has a high viscosity. In the most preferred embodiment, the composition is formed from a binder precursor that is 100% solids (i.e. no volatile solvents at process temperature).

Methods of forcing the binder precursor and abrasive grains through a perforated substrate comprise extrusion, milling, calendering or combinations thereof. In a preferred embodiment, the method of forcing is provided by a size reduction machine, manufactured by Quadro Engineering Incorporated.

In one embodiment, the abrasive agglomerate precursor particles are irradiated by being passed through a first curing zone which contains a radiation source. Preferred sources of radiation comprise electron beam, ultraviolet light, visible light, laser light or combinations thereof. In another embodiment, the abrasive agglomerate particles are passed through a second curing zone to be further cured. Preferred energy sources in the second curing zone comprise thermal, electron beam, ultraviolet light, visible light, laser light, microwave or combinations thereof.

In a preferred embodiment, the abrasive agglomerate particles are filamentary shaped and have a length ranging from about 100 to about 5000 micrometers. Most preferably, the filamentary shaped abrasive agglomerate particles range in length from about 200 to about 1000 micrometers. In one embodiment, the abrasive agglomerate particles are reduced in size after either the first irradiation step or after being passed through the second curing zone. The preferred method of size reducing is with the size reduction machine manufactured by Quadro Engineering Incorporated.

In one embodiment, the cross-sectional shapes of the agglomerate particles comprise circles, polygons or combinations thereof. Preferably, the cross-sectional shape is constant.

In one embodiment, the agglomerate particles comprise an inorganic binder precursor additive. Preferably, the inorganic binder precursor additive comprises glass powder, frits, clay, fluxing minerals, silica sols, or combinations thereof.

In one embodiment, the abrasive agglomerate precursor particles comprise a modifying additive. Preferably, the modifying additive comprises coupling agents, grinding aids, fillers, surfactants or combinations thereof.

The abrasive agglomerate particles of the invention may be incorporated into conventional abrasive articles (e.g. bonded abrasives, coated abrasives and nonwoven abrasives). Abrasive articles, with the abrasive agglomerate particles of the present invention, have exhibited long life, high cut rates and good surface finishes.

DETAILED DESCRIPTION

In general, the present invention involves a method for making particles. The method involves forcing a composition, comprising a binder precursor and abrasive grains, through a perforated substrate to form particles. After the particles separate, or are separated, from the perforated substrate, part or all of the binder precursor is irradiated to cure or solidify the binder precursor and to provide solidified, handleable binder and abrasive agglomerate particles.

Figure 1:
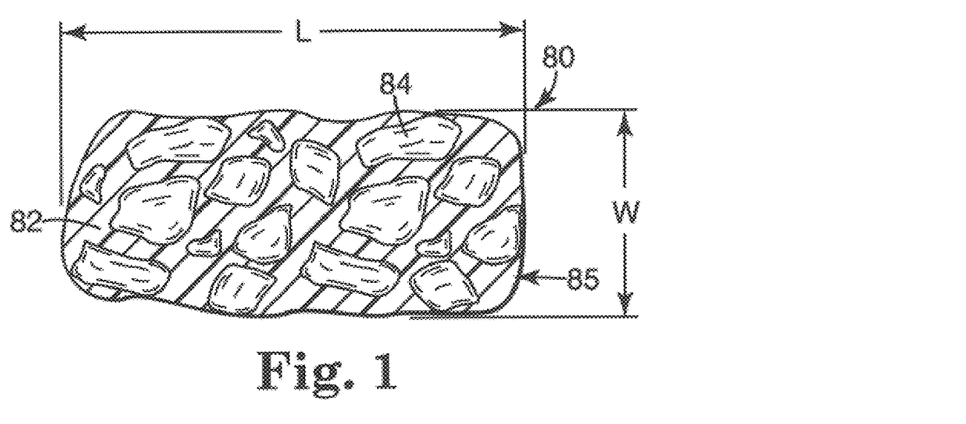
FIG. 1 is a schematic side view in elevation of an abrasive agglomerate particle made according to the method of this invention. The particle has a substantially circular cross-section.
Figure 2:
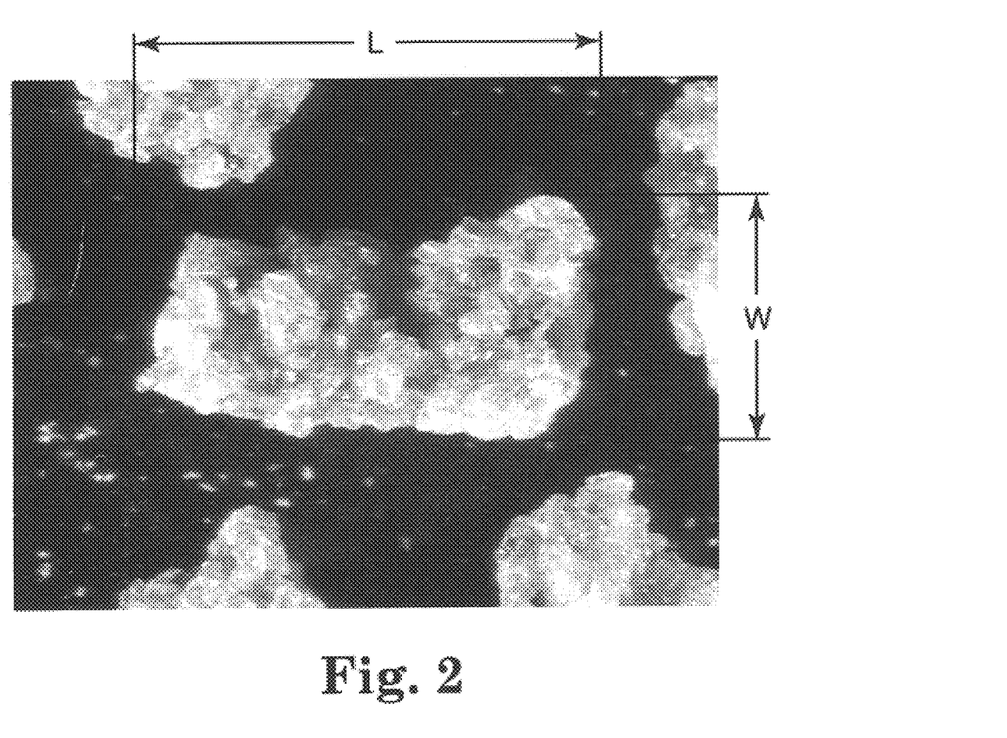
FIG. 2 is a photomicrograph of an abrasive agglomerate particle made according to the method of this invention. The particle has a substantially circular cross-section.

FIG. 1 illustrates a preferred, non-limiting example of a filamentary shaped abrasive agglomerate particle made by the method of the present invention.

FIG. 1 illustrates what is meant by the term "filamentary shaped abrasive agglomerate particle." The abrasive agglomerate particle 80 itself comprises a binder 82 and plurality of abrasive grains 84. The rough corners 85 permit formation of a strong mechanical bond to the maker and size coats used in normal coated abrasive manufacturing techniques.

As used herein, the expression "filamentary shaped" means the abrasive agglomerate particle has an aspect ratio (aspect ratio=length of particle (L)/width of particle (W)) greater than or equal to one. For example, FIG. 1 illustrates a filamentary shaped abrasive agglomerate particle with an aspect ratio greater than one. In FIG. 1, abrasive agglomerate particle length L is greater than particle width W.

As used herein, the expression "binder precursor" means any material that is deformable or may be made to be deformed by heat or pressure or both and that can be rendered handleable by means of radiation energy, thermal energy or both. As used herein, the expression "solidified, handleable binder" means part or all of the binder precursor has been polymerized or cured to such a degree that it will not substantially flow or experience a substantial change in shape. The expression "solidified, handleable binder" does not mean that part or all of the binder precursor is always fully polymerized or cured, but that it is sufficiently polymerized or cured to allow collection thereof after being irradiated, without leading to substantial change in shape of the binder. As used herein, the term "binder" is synonymous with the expression "solidified, handleable binder."

As used herein, the expression "inorganic binder precursor" refers to particulate additives which, when heated at a temperature sufficient to burn out organic materials present in the agglomerate particle, may subsequently fuse together to form a rigid, inorganic phase bonding the aggregate particle together. Examples of inorganic binder precursors include glass powder, frits, clay, fluxing minerals, silica sols, or combinations thereof.

As used herein the expression "inorganic aggregate precursor agglomerate particle" refers to an agglomerate particle of the present invention compromising a plurality of solid particles, a radiation curable polymerizable binder precursor, and inorganic binder precursor particulate additives.

As used herein, the expression "radiation curable polymerizable" refers to that portion of the binder precursor that may be rendered a solidified, handleable binder as a result of polymerization that is initiated by means of radiation energy.

As used herein, the expression "perforated substrate" means any material with one or more openings to allow a composition comprising binder precursor and abrasive grains to be forced through the opening or openings. The material should also have sufficient integrity to withstand any backpressure, frictional heating or conductive/convective heating. In general, perforated substrates may include, for example, mesh screens (as described, for example, in U.S. Pat. No. 5,090,968), film dies, spinneret dies, sieve webs (as described, for example, in U.S. Pat. No. 4,393,021) or screens (as described, for example, in U.S. Pat. No. 4,773,599). Preferred perforated substrates of the present invention comprise conical screens with geometrical opening from one mil to 500 mil diameter. Most preferred perforated substrates of the present invention comprise conical screens with circular opening from 15 mils to 250 mils diameter.

Figure 3:
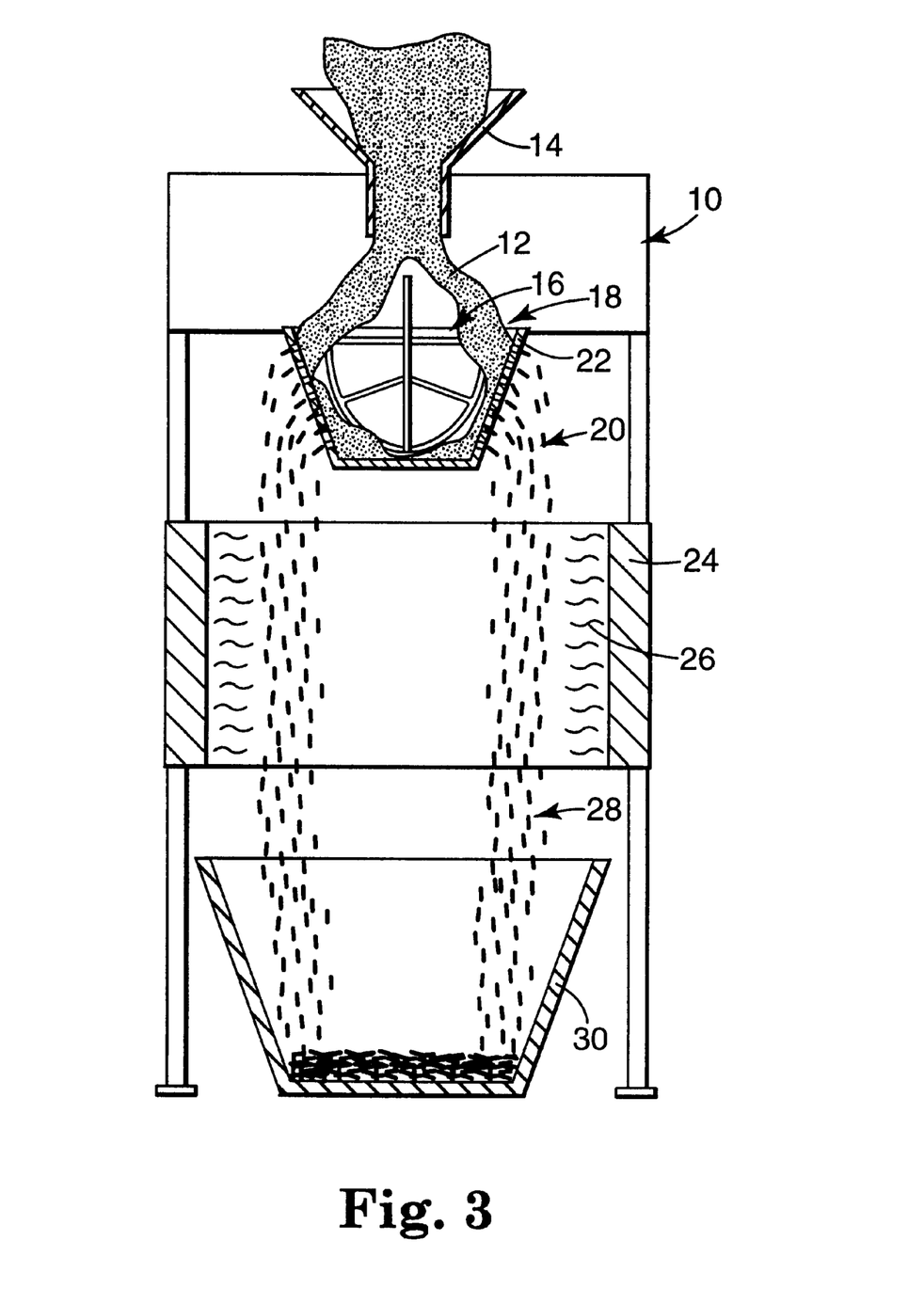
FIG. 3 is a schematic side view illustrating a method of this invention.

FIG. 3 illustrates a preferred apparatus 10 suitable for carrying out the method of this invention to make filamentary shaped abrasive agglomerate particles. In apparatus 10, a composition 12 comprising binder precursor and abrasive grains is fed by gravity from a hopper 14 or by hand into an input 16 of a machine 18 to form filamentary shaped abrasive agglomerate precursor particles 20. The filamentary shaped abrasive agglomerate precursor particles 20 separate from size reduction screen 22. The filamentary shaped abrasive agglomerate precursor particles fall, by gravity, through a curing zone 24 where they are exposed to an energy source 26 to at least partially cure the binder precursor to provide solidified, handleable binder and filamentary shaped abrasive agglomerate particles. The filamentary shaped abrasive agglomerate particles 28 are collected in a container 30.

Figure 4:
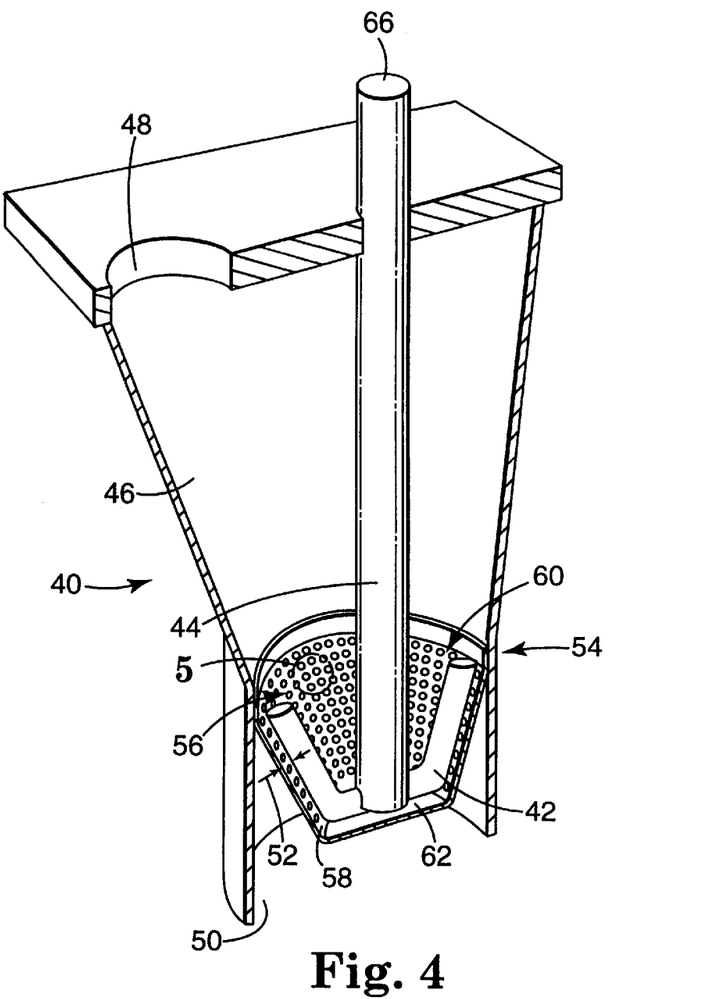
FIG. 4 is a perspective view of a size reduction machine with a front portion of said machine being cut away to expose an interior of said machine.

The machine 18 in FIG. 3 may be any material forming apparatus such as, for example, an extruder, milling/size reducing machine, pellitizer and pan abrasive agglomerater. FIG. 4 illustrates a highly preferred material forming apparatus, a size reduction machine, manufactured by Quadro Engineering Incorporated, model # 197, referred to hereinafter as the "Quadro® Comil®." The Quadro® Comil® 40 has an impeller 42 mounted on a rotatable shaft 44. The shaft 44 and impeller 42 are located in a channel 46 having an input 48 and an output 50. The impeller 42 is shaped and mounted so that a gap 52 between an edge of said impeller and a tapered wall of said screen is substantially constant as said impeller rotates relative to said screen.

Generally, the impeller 42 shape may be, for example, round, flat or angular flats. The preferred impeller 42 shapes used in the present invention may be round. The most preferred impeller 42 shapes used in the present invention are arrowhead shaped.

Generally, the gap 52 width may range in size, for example, from 1–200 mils. The most preferred gap 52 width used in the present invention may be from 5 to 50 mils.

Adjusting the impeller 42 rotation speed to optimize manufacturing conditions will be readily apparent to one skilled in the art. The most preferred impeller 42 rotation speed used in the present invention may be from 50 to 3500 rpm.

Figure 5:
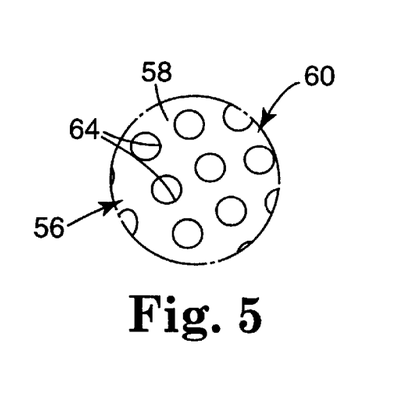
FIG. 5 is a perspective view of a screen used in the size reduction machine of FIG. 4.

The channel 46 also contains a support 54 and a screen 56 that is held within the support so that any binder precursor or solidified, handleable binder passing from said input 48 to said output 50 passes through the screen 56. The screen 56 has a tapered aperture wall 58 formed into a frusto-conical shape, with a wide end 60 of the screen 56 being open and a narrow end 62 being at least partially closed. In most uses, it is desirable to have the narrow end 62 completely closed. The screen has openings 64 that are shaped.

Generally, the screen opening 64 shapes may be curved, circular or polygonal, including, for example, triangles, squares, and hexagons. The preferred screen opening 64 shapes used in the present invention may be circular or square. The most preferred screen opening 64 shapes used in the present invention may be square or circular, ranging in size from 15 mil–250 mil.

As can readily be seen from FIG. 4, an end 66 of the shaft 44 protrudes from the channel 46. A power source (not shown) can easily be attached to the end 66 of the shaft 44 to cause the shaft 44 and impeller 42 to rotate relative to said screen 56. Preferably, the power source is a variable speed electric motor. However, the power source is conventional and many other power sources will be suitable to operate the Quadro® Comil® 40.

FIG. 3 illustrates a separating step of the method of this invention. In general, the separation step can be active or passive. The passive method of separation is illustrated in FIG. 3. Passive separation is the result of the formed composition reaching a critical length and separating from the screen opening after the composition has been forced through a perforated substrate. Passive separation is a function of, for example, the following: 1) the physical and/or chemical properties of the composition (including viscosity), 2) the physical and chemical properties of process equipment that interfaces with the composition (including the perforated substrate) and 3) process operating conditions (including composition flowrate). Active separation is the result of process equipment mechanically separating the formed composition from the perforated substrate. An example of active separation may be, for example, a doctor blade or air knife moving perpendicular to direction of composition flow.

FIG. 3 illustrates, in general, the irradiation step. Sources of radiation energy in the irradiation step, the first curing zone or the second curing zone comprise electron beam energy, ultraviolet light, visible light, microwave, laser light or combinations thereof.

In a preferred embodiment, ultraviolet light is used as a radiation source. In the same embodiment, mirrors are used in a chamber containing the ultraviolet radiation source to reflect the ultraviolet waves in a way that intensifies the energy transmitted to the abrasive agglomerate precursor particles.

Electron beam radiation, which is also known as ionizing radiation, can be used at an energy level of about 0.1 to about 20 Mrad, preferably at an energy level of about one to about 10 Mrad. Ultraviolet radiation refers to radiation having a wavelength within the range of about 200 to about 400 nanometers, preferably within the range of about 250 to 400 nanometers. The dosage of radiation can range from about 50 to about 1000 mJ/cm$^2$, preferably from about 100 mJ/cm$^2$ to about 400 mJ/cm$^2$. Examples of lamp sources that are suitable for providing this amount of dosage provide about 100 to about 600 watts/inch, preferably from about 300 to about 600 watts/inch. Visible radiation refers to nonparticulate radiation having a wavelength within the range of about 400 to about 800 nanometers, preferably in the range of about 400 to about 550 nanometers. The amount of radiation energy needed to sufficiently cure the binder precursor depends upon factors such as the chemical identity of the binder precursor, the residence time in the first curing zone, the type of abrasive grains and the type of, if any, optional modifying additives.

Optionally, the abrasive agglomerate particles made by the present invention may be passed through a second curing zone, thereby curing uncured binder precursor, if any, and providing a filamentary shaped abrasive agglomerate with different properties than the filamentary shaped abrasive agglomerate particle made after the first curing zone. In the second irradiation step, the binder precursor is preferably capable of being cured by radiation or thermal energy. Sources of radiation energy were discussed above. Sources of thermal energy may include, for example, hot air impingement, heated water and infrared radiation. Conditions for thermal curing range from about 50° C. to about 200° C. and for a time of from fractions to hundreds of minutes. The actual amount of heat required is greatly dependent on the chemistry of the binder precursor.

In one embodiment, filamentary shaped abrasive agglomerate particles of the present invention may have an aspect ratio in the range from one to 30, preferably from one to 15 and most preferably from one to 5.

In general, binder precursors which can be rendered handleable as a result of polymerizing by means of radiation energy may include, for example, acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof. The term acrylate includes both acrylates and methacrylates.

Acrylated urethanes are diacrylate esters of hydroxy terminated isocyanate extended polyesters or polyethers. Examples of commercially available acrylated urethanes include "UVITHANE 782" and "UVITHANE 783," both available from Morton Thiokol Chemical, and "CMD 6600", "CMD 8400", and "CMD 8805", available from Radcure Specialties.

Acrylated epoxies are diacrylate esters of epoxy resins, such as the diacrylate esters of bisphenol an epoxy resin. Examples of commercially available acrylated epoxies include "CMD 3500", "CMD 3600", and "CMD 3700", available from Radcure Specialties.

Ethylenically unsaturated compounds include both monomeric and polymeric compounds that contain atoms of carbon, hydrogen and oxygen, and optionally, nitrogen and the halogens. Oxygen atoms, nitrogen atoms or both are generally present in ether, ester, urethane, amide, and urea groups. Ethylenically unsaturated compounds preferably have a molecular weight of less than about 4,000 and are preferably esters resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerthyitol triacrylate, pentaerthritol methacrylate, and pentaerythritol tetraacrylate. Other ethylenically unsaturated compounds include monoallyl, polyallyl, and polymethylallyl esters and amides of carboxylic acids, such as diallyl phthalate, diallyl adipate, and N,N-diallyladipamide. Still, other ethylenically unsaturated compounds include styrene, divinyl benzene, and vinyl toluene. Other nitrogen-containing, ethylenically unsaturated compounds include tris(2-acryloyloxyethyl) isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

The aminoplast can be monomeric or oligomeric. The aminoplast resins have at least one pendant a,b-unsaturated carbonyl group per molecule. These a,b-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472.

Isocyanurate derivatives having at least one pendant acrylate group and isocyanate derivatives having at least one pendant acrylate group are further described in U.S. Pat. No. 4,652,274. Preferred isocyanurate material is a triacrylate of tris(hydroxy ethyl) isocyanurate.

Examples of vinyl ethers suitable for this invention include vinyl ether functionalized urethane oligomers, commercially available from Allied Signal under the trade designations "VE 4010", "VE 4015", "VE 2010", "VE 2020", and "VE 4020".

Epoxies have an oxirane ring and are polymerized by the ring opening via a cationic mechanism. Epoxy resins include monomeric epoxy resins and polymeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of epoxy resins preferred for this invention include 2,2-bis[4-(2,3-epoxypropoxy)phenyl] propane (diglycidyl ether of bisphenol A) and materials under the trade designation "Epon 828", "Epon 1004" and "Epon 1001F", commercially available from Shell Chemical Co., "DER-331", "DER-332" and "DER-334", commercially available from Dow Chemical Co. Other suitable epoxy resins include glycidyl ethers of phenol formaldehyde novolac (e.g., "DEN-431" and "DEN-428", commercially available from Dow Chemical Co.). The epoxy resins used in the invention can polymerize via a cationic mechanism with the addition of appropriate photoinitiator(s). These resins are further described in U.S. Pat. Nos. 4,318,766 and 4,751,138.

If ultraviolet or visible light is utilized, a photoinitiator is preferably included in the mixture. Upon being exposed to ultraviolet or visible light, the photoinitiator generates a free radical source or a cationic source. This free radical or cationic source then initiates the polymerization of the binder precursor. A photoinitiator is optional when a source of electron beam energy is utilized.

Examples of photoinitiators that generate a free radical source when exposed to ultraviolet light include, but are not limited to, those selected from the group consisting of organic peroxides, azo compounds, quinones, benzophenones, nitroso compounds, acyl halide, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are described in U.S. Pat. No. 4,735,632.

Cationic photoinitiators generate an acid source to initiate the polymerization of an epoxy resin or a urethane. Cationic photoinitiators can include a salt having an onium cation and a halogen-containing complex anion of a metal or metalloid. Other cationic photoinitiators include a salt having an organometallic complex cation and a halogen-containing complex anion of a metal or metalloid. These photoinitiators are further described in U.S. Pat. No. 4,751,138. Another example is an organometallic salt and an onium salt described in U.S. Pat. No. 4,985,340; EP 0 306 161 and EP 0 306 162. Still other cationic photoinitiators include an ionic salt of an organometallic complex in which the metal is selected from the elements of Periodic Groups IVB, VB, VIB, VIIB, and VIIIB. This type of photoinitiator is described in EP 0 109 581.

The cured binder precursor, i.e., the binder, functions to bond the abrasive grains together to form a shaped abrasive agglomerate particle. The abrasive grains typically have an average particle size ranging from about 0.5 to 1500 micrometers, preferably from about one to about 800 micrometers, and most preferably from about one to about 400 micrometers. In a preferred embodiment, the abrasive grains have a Mohs hardness of at least about 8, more preferably above 9. Examples of materials of such abrasive grains include fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, or combinations thereof. The ceramic aluminum oxide is preferably made according to a sol gel process, such as described in U.S. Pat. Nos. 4,314,827; 4,744,802; 4,623,364; 4,770,671; 4,881,951; 5,011,508; and 5,213,591. The ceramic abrasive grain comprises alpha alumina and, optionally, a metal oxide modifier, such as magnesia, zirconia, zinc oxide, nickel oxide, hafnia, yttria, silica, iron oxide, titania, lanthanum oxide, ceria, neodynium oxide, and combinations thereof. The ceramic aluminum oxide may also optionally comprise a nucleating agent, such as alpha alumina, iron oxide, iron oxide precursor, titania, chromia, or combinations thereof. The ceramic aluminum oxide may also have a shape, such as that described in U.S. Pat. Nos. 5,201,916 and 5,090,968.

The abrasive grain may also have a surface coating. A surface coating can improve the adhesion between the abrasive grain and the binder in the abrasive agglomerate particle and/or can alter the abrading characteristics of the abrasive grain. Such surface coatings are described in U.S. Pat. Nos. 5,011,508; 1,910,444; 3,041,156; 5,009,675; 4,997,461; 5,213,591; and 5,042,991. An abrasive grain may also contain a coupling agent on its surface, such as a silane coupling agent. Examples of coupling agents suitable for this invention include organo-silanes, zircoaluminates, and titanates. Examples of anti-static agents include graphite, carbon black, conductive polymers, humectants, vanadium oxide, and the like. The amounts of these materials can be adjusted to provide the properties desired The composition for use in this invention can further comprise optional modifying additives, such as, for example diluents, antistatic agents, lubricants, pigments, suspending agents, coupling agents, grinding aids, fillers, inorganic binder precursors, surfactants or combinations thereof.

In one embodiment, the abrasive grains comprise a single type of abrasive grain, two or more types of different abrasive grains, or at least one type of abrasive grain with at least one type of filler material. Examples of materials for filler include calcium carbonate, glass bubbles, glass beads, greystone, marble, gypsum, clay, $SiO_2$, $Na_2 SiF_6$, cryolite, organic bubbles, organic beads, and the like.

Grinding aids encompass a wide variety of different materials and can be inorganic or organic. Examples of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids and, in some instances, this may produce a synergistic effect. The above-mentioned examples of grinding aids are meant to be a representative showing of grinding aids, and it is not meant to encompass all grinding aids.

Antistatic agents may include graphite, carbon black, conductive polymer particles or combinations thereof.

Examples of fillers suitable for this invention include wood pulp, vermiculite, and combinations thereof, metal carbonates, such as calcium carbonate, e.g., chalk, calcite, marl, travertine, marble, and limestone, calcium magnesium carbonate, sodium carbonate, magnesium carbonate; silica, such as amorphous silica, quartz, glass beads, glass powder, glass bubbles, and glass fibers; silicates, such as talc, clays (montmorillonite), feldspar, mica, calcium silicate, calcium metasilicate, sodium aluminosilicate, sodium silicate; metal sulfates, such as calcium sulfate, barium sulfate, sodium sulfate, aluminum sodium sulfate, aluminum sulfate; gypsum; vermiculite; wood flour; aluminum trihydrate; metal oxides, such as calcium oxide (lime), aluminum oxide, titanium dioxide, and metal sulfites, such as calcium sulfite.

In a preferred embodiment, it is preferred that a filamentary shaped abrasive agglomerate particle be capable of breaking down during abrading. The selection and amount of the binder precursor, abrasive grains, and optional additives will influence the breakdown characteristics of the particle.

Examples of inorganic binder precursors suitable for this invention include glass powder, frits, clay, fluxing minerals, silica sols, or combinations thereof.

The following examples will further illustrate specific embodiments of the present invention. Those of ordinary skill in the art will recognize that the present invention also includes modifications and alterations of the embodiments set out in the examples and that the illustrative examples do not limit the scope of the claimed invention.

EXAMPLES

The following abbreviations are used in the examples. All parts, percentages, ratios, etc., in the examples are by weight unless otherwise indicated.

AO: heat treated fused aluminum oxide abrasive grit; commercially available from Treibacher, Villach, Austria.
ASF: amorphous silica filler, commercially available from DeGussa Corp. under the trade designation "OX-50".
AG321: sol gel-derived alumina-based abrasive grain commercially available from Minnesota Mining and Manufacturing, St. Paul, Minn. under the trade designation "Cubitron 321".
CaCO3: calcium carbonate filler commercially available from J. M. Huber Corp., Quincy, Ill.
CEO: Ceria abrasive particles having an average particle size of about 0.5 micrometer, commercially available from Rhone Poulenc, Shelton, Cont.
Cer: Ceramic abrasive mineral CCPL commercially available from Treibacher, Villach, Austria.
CH: Cumene Hydroperoxide, commercially available from Aldrich Chemical Company, Inc Milwaukee, Wis.
CMSK: treated calcium metasilicate filler, commercially available from NYCO, Willsboro, N.Y. under the trade designation "WOLLOSTOKUP".
CRY: cryolite RTN commercially available from Tarconard Trading a/s, Avemakke Nyberg, Denmark.
EAA: ethylene acrylic acid co-polymer primer for the PET film backing.
KB1: 2,2-dimethoxy-1,2-diphenylethanone, commercially available from Lamberti S.P.A. (through Sartomer Co.) under the trade designation "ESACURE KB 1".
KBF4: potassium tetrafluoroborate SPEC 102 and 104 commercially available from Atotech USA, Inc., Cleveland, Ohio.
PC: Pearless Clay #4, commercially available from R. T. Vanderbilt Co., Inc., Bath, S.C.
Perkadox 16S, Di-(4-tert-butylcyclohexyl) peroxy di-carbonate commercially available from AKZO Nobel Chemical, Inc., Chicago, Ill.
PET: 5 mil (125 micron) thick polyester film backing.
PH2: 2-benzyl-2-N,N-dimethylamino-1-(4-morpholinophenyl)-1-butanone, commercially available from Ciba Geigy Corp. under the trade designation "Irgacure 369".
PH3: 2-phenyl-2,2-dimethoxyacetophenon, commercially available from Ciba Geigy Corp. under the trade designation "Irgacure 651".
PRO: a mixture of 60/40/1 TMPTA/TATHEIC/KB1, commercially available from Sartomer, Co.
SCA: silane coupling agent, 3-methacryloxypropyl-trimethoxysilane, commercially available from Union Carbide under the trade designation "A-174".
SGP: alumino-boro-silicate glass powder, −325 mesh, commercially available from Specialty Glass Inc., Oldsmar, Fla., under the trade designation "SP1086".
SiC: Silicon carbide abrasive mineral commercially available from Minnesota Mining and Manufacturing, St. Paul, Minn.
TATHEIC: triacrylate of tris(hydroxy ethyl)isocyanurate, commercially vailable from Sartomer Co., under the trade designation "SR368".
TMPTA: trimethylol propane triacrylate, commercially available from Sartomer Co. under the trade designation "SR351".
VAZO 52: 2,2-Azo bis(2,4-dimethyl pentane nitrile) commercially available from DuPont Co., Wilmington, Del.

General Procedure for Making Abrasive Agglomerate Precursor Particles Slurry

In order to form a slurry composition comprising a binder precursor and abrasive grains, the components can be mixed together by any conventional technique, such as, for example high shear mixing, air stirring, or tumbling. A vacuum can be used on the mixture during mixing to minimize entrapment of air.

A slurry composition is prepared by thoroughly mixing the abrasive grains and thermal initiator, if any, into a pre-mix. The pre-mix comprises a binder precursor, which includes the ingredients listed in Table 1 or Table 1A. After mixing, the slurry is refrigerated to cool down before any additional process steps are made. The slurry compositions are very thick with cement like handling characteristics. The ratios in Table 1 and Table 1A are based upon weight.

TABLE 1

Composition of premix #1

| Ingredient | % |
|---|---|
| PH2 | .568 |
| TMPTA | 39.4 |
| TATHEIC | 16.89 |
| KBF4 | 39.21 |
| ASF | 1.96 |
| SCA | 1.96 |

TABLE 1A

Composition of premix #2

| Ingredient | % |
|---|---|
| KB1 | .274 |
| TMPTA | 32.874 |
| TATHEIC | 21.916 |
| CMSK | 41.09 |
| ASF | 1.1 |
| SCA | 2.74 |

General Procedure for Making Abrasive Agglomerate Particles

In a preferred embodiment, the slurry is processed into abrasive agglomerate particles with the aid of a size reduction machine, manufactured by Quadro Engineering Incorporated, model # 197, referred to hereinafter as the "Quadro® Comil®." Preferably, the Quadro® Comil® is setup with an impeller and a fixed spacer. A conical screen with round or square shaped hole openings is used to generate the filamentary shape desired. The slurry is added through the hopper of the Quadro® Comil® while the impeller is spinning at a preset speed (rpm). The slurry is forced through the openings in the conical screen by the impellers and when a critical length is reached the filamentary shaped agglomerate precursor particle separates from the outside of the screen and falls by gravity through a UV curing chamber (designed and built by Fusion Company, model # DRE 410 Q) equipped with two 600 watt "d" Fusion lamps set on high power. The filamentary shaped agglomerate precursor particles are partially cured by the exposure to the UV radiation and thereby converted into a solid handleable form. The filamentary shaped abrasive agglomerate particles may be further cured with exposure to thermal energy, microwave energy or additional UV energy as desired in the examples below.

General Procedure for Making Coated Abrasive Article Using Abrasive Agglomerate Particles The abrasive articles employing the abrasive agglomerate particles of the present invention were made by applying a 12 mil coating of a premix (made from Table 1) to a 5 mil film of PET with a 0.8 mil EAA prime. The abrasive agglomerate particles were poured onto the coated film and the abrasive agglomerate particles were tumbled on the coated web until a uniform coating was achieved. The excessive abrasive agglomerate particles were removed by shaking the coated web until all the excess particles fall off. The coated sample was taped to a metal plate and exposed to UV and visible light by being passed 3 times under a 600 watt "D" Fusion lamp set on high power at 30 FPM. The cured sample was flexed over a 2-inch bar. Next the abrasive article was size coated with the premix (made from Table 1) and applied with a paint bush. The excess size was removed by adsorbing into a paper towel. An air stream is applied to spread the size coat more uniformly. Running the sample under the UV lamp for an additional 3 passes at 30 FPM then cures the sized sample. The cured abrasive article is again flexed over a two-inch bar. The samples are cut to size for testing according to the rocker drum test, test procedure described below.

Test Procedures

Rocker Drum Test

Flexed abrasive articles are converted into 10 inch by 2.5 inch (25.4 cm by 6.4 cm) sheets. These samples were installed on a cylindrical steel drum of a testing machine, which oscillates (rocks), back and forth in a small arc. A 1018 carbon steel workpiece, $3/16$ inch (0.48 cm) square, was fixed in a lever arm arrangement above the abrasive sample, and load of 8 lb (3.6 kg) was applied to the workpiece. As the abrasive article rocked back and forth, the workpiece was abraded, and a $3/16$ inch by 5.5 inch (0.48 cm by 14 cm) wear path was created on the abrasive article. There were approximately 60 strokes per minute on this wear path. A compressed air stream (20 psi) was directed onto the sample to clear grinding swarf and debris from the wear path. The amount of steel removed after 1000 cycles (one cycle being one back-and-forth motion) was recorded as the interval cut, and the total cut was the cumulative amount of steel removed at the endpoint of the test.

Crush Test

Approximately 5 grams of abrasive agglomerate particles are placed in a Dixie cup and crushed by hand to reduce the length, if initially shaped as filaments. The crushed abrasive agglomerate particles are poured onto a glass plate. Only samples that were less than 100 mils in length were crushed. The crush tester used was a Chatillon Model DPP-25 force gauge equipped with a flat compression fitting. The force gauge reads from 0–25 pounds. The flat compression foot of the force gauge was placed in a horizontal position above the particle to be crushed and a constant force was applied by hand until the particle broke (audible sound and/or feel). The force required to break the particle was recorded and the test was repeated on eleven other samples. The Crush Test values listed in the tables are the average forces to break twelve particles of the experimental formulations.

EXAMPLES 1–5

The abrasive agglomerate particles of example 1 were prepared by thoroughly mixing 900 grams of the premix composition in Table 1 with 2.2 grams of CH and 3450 grams P-120 AO mineral under low shear. The slurry was processed through the Quadro® Comil® set up with a 45 round conical screen spaced at 0.075 thousands with a small round impeller running at 1601 RPM. The abrasive agglomerate precursor particles dropped by gravity through the UV curing chamber to form abrasive agglomerate particles. The abrasive agglomerate particles were further cured for 4 minutes in a microwave oven at 1000 watts. The abrasive agglomerate particles were size reduced by running them once through the Quadro® Comil® set up with a grater screen (opening size 94 mils), a 0.05 spacer and reverse cutter square impeller at 1601 RPM. The size reduced abrasive agglomerate particles were then made into an abrasive article according to the procedure for making an abrasive article for rocker drum testing. The rocker drum cut results for example 1 are shown in Table 2.

The examples 2–5 were made by the same procedure as example 1 except for the following changes: the abrasive agglomerate particles were not further cured in a microwave oven, but in a thermal oven for 7 hours at 230 F. Example 2 was size reduced by being passed three times through a 125-mil grater screen. Example 3 was size reduced by being passed two times through a 94-mil grater screen. Example 4 was size reduced by being passed one time through a 79-mil grater screen. Example 5 was size reduced by being passed one time through a 62-mil grater screen.

Comparative example A is a commercially available product from VSM, (Hannover, Germany) under the product code P-120 KK712.

TABLE 2

| Example Number | Rocker Drum Cycles | Cut (grams) |
| --- | --- | --- |
| 1 | 1000 | .74 |
|  | 2000 | .68 |
|  | 3000 | .55 |
|  | 4000 | .46 |
|  | 5000 | .26 |
| Comparative A | 1000 | .73 |
|  | 2000 | .74 |
|  | 3000 | .70 |
|  | 4000 | .63 |
|  | 5000 | .37 |
| 2 | 1000 | .76 |
|  | 2000 | .80 |
|  | 3000 | .76 |
|  | 4000 | .70 |
| 3 | 1000 | .79 |
|  | 2000 | .83 |
|  | 3000 | .79 |
|  | 4000 | .70 |
| 4 | 1000 | .76 |
|  | 2000 | .84 |
|  | 3000 | .83 |
|  | 4000 | .61 |
| 5 | 1000 | .70 |
|  | 2000 | .78 |
|  | 3000 | .74 |
|  | 4000 | .62 |

The dry Rocker Drum Test results shown in Table 2 show that when abrasive agglomerate particles are made using the method of the present invention and are used in an abrasive article, they provide grinding results on mild steel that are comparable to a commercially available coated abrasive product that contained abrasive agglomerated particles with the same mineral grade. The results in Table 2 also suggest that the size of the abrasive agglomerate particles generated by the size reduction step have an influence on grinding performance.

EXAMPLES 6–10

The abrasive agglomerate particles of examples 6–10 were prepared by thoroughly mixing 630 grams of the premix composition in Table 1 with 1.8 grams of CH and 2415 grams P-120 AO mineral under low shear.

The slurry was processed through the Quadro® Comil® which was set up with conical screens of various sizes and shapes listed in Table 3 and spaced at 0.075 thousands with a small round impeller running at 1601 RPM. After passing through the UV cure chamber, the abrasive agglomerate particles were further cured in a thermal oven for 6 hours at 350 F. The abrasive agglomerate particles were size reduced by running them once through the Quadro® Comil® equipped with a grater screen opening size 74 mils, a 0.05 spacer and reverse cutter square impeller running at 300 RPM. The size reduced abrasive agglomerate particles were then made into an abrasive article according to the procedure for making an abrasive article for rocker drum testing. The dry Rocker Drum Test results for examples 6–10 are shown in Table 3.

TABLE 3

| Example Number | Rocker Drum Cycles | Cut (grams) | Screen Description | Crush Strength (Pounds) |
| --- | --- | --- | --- | --- |
| 6 | 1000 | .75 | Square/ 62 mil/ 37 mil thick | 10.4 |
|  | 2000 | .71 |  |  |
|  | 3000 | .64 |  |  |
|  | 4000 | .58 |  |  |
|  | 5000 | .44 |  |  |
| 7 | 1000 | .78 | Round/ 45 mil dia./ 31 mil thick | 9.3 |
|  | 2000 | .74 |  |  |
|  | 3000 | .65 |  |  |
|  | 4000 | .60 |  |  |
|  | 5000 | .37 |  |  |
| 8 | 1000 | .74 | Round/ 62 mil dia./ 37 mil thick | 11.4 |
|  | 2000 | .70 |  |  |
|  | 3000 | .67 |  |  |
|  | 4000 | .60 |  |  |
|  | 5000 | .40 |  |  |
| 9 | 1000 | .76 | Round/ 32 mil dia./ 25 mil thick | 9.5 |
|  | 2000 | .77 |  |  |
|  | 3000 | .76 |  |  |
|  | 4000 | .70 |  |  |
|  | 5000 | .64 |  |  |
|  | 6000 | .54 |  |  |
| 10 | 1000 | .76 | Round/ 75 mil dia./ 37 mil thick | 3.9 |
|  | 2000 | .66 |  |  |
|  | 3000 | .56 |  |  |
|  | 4000 | .47 |  |  |
|  | 5000 | .41 |  |  |

The dry Rocker Drum Test results shown in Table 3 indicate that the unit cross sectional area of the abrasive agglomerate particles affects the cut rate over the life of the particle. It also indicates that acceptable levels of performance can be achieved with other shapes as demonstrated by the results of the abrasive agglomerate particles made with the square screen. Looking at the cross sectional area of the abrasive agglomerate particles under a microscope indicates that the square screen made abrasive agglomerate particles with a square unit cross section and the round screen made abrasive agglomerate particles with a round unit cross section.

EXAMPLES 11–15

Examples 11–15 were made the same as example 6 except the amount of premix was changed for examples 12–15 to study the effect of mineral loading on making abrasive agglomerate particles with the method of this invention. Instead of 630 grams of premix used in example 6 and 11, 609 grams was used for example 12, 579 grams for example 13, 670 grams for example 14 and 548 grams for example 15.

The following changes were made on the Quadro® Comil® for these examples. The large round impeller blade with a 0.125 mil spacer run at 350 RPM was used to make abrasive agglomerate particles. The results are in Table 4.

TABLE 4

| Example Number | Rocker Drum Cycles | Cut (grams) | Crush Strength (pounds) |
|---|---|---|---|
| 11 | 1000 | .70 | 8.9 |
|    | 2000 | .66 |     |
|    | 3000 | .64 |     |
|    | 4000 | .52 |     |
|    | 5000 | .49 |     |
| 12 | 1000 | .74 | 9.0 |
|    | 2000 | .68 |     |
|    | 3000 | .59 |     |
|    | 4000 | .51 |     |
|    | 5000 | .38 |     |
| 13 | 1000 | .72 | 8.9 |
|    | 2000 | .70 |     |
|    | 3000 | .60 |     |
|    | 4000 | .54 |     |
|    | 5000 | .46 |     |
| 14 | 1000 | .68 | 8.3 |
|    | 2000 | .66 |     |
|    | 3000 | .56 |     |
|    | 4000 | .50 |     |
|    | 5000 | .40 |     |
| 15 | 1000 | .72 | 8.3 |
|    | 2000 | .74 |     |
|    | 3000 | .67 |     |
|    | 4000 | .54 |     |
|    | 5000 | .51 |     |

The Quadro® Comil® was able to process examples 11–15, but the mineral loading affected the amount of abrasive agglomerate particles that adhered together and were cured together by the UV lamps. Example 14, which had the lowest mineral loading, had as many as 8–10 individual abrasive agglomerate particles adhered together and were cured together by the UV curing step. By comparison, example 15, which had the highest mineral loading, did not have any abrasive agglomerate particles adhere and cure together. Examples 11–13 had varying amounts of abrasive agglomerate particles adhered and cured together, usually about 2 or 3. The adhered/cured abrasive agglomerate particles were very easy to separate except in the case of example 14. The dry Rocker Drum test results listed in Table 4 also indicate that the mineral loading does affect the cut rate over the length of the test.

The coated abrasive articles of Examples 1–15 were made with an all UV cure make and size system

EXAMPLES 16–20

Examples 16–20 were run to show that other mineral types and sizes could be processed through the Quadro® Comil®. Table 5 lists the formulations for examples 16–20. These slurries were mixed according to the procedure for example 1. Example 18 had an additional 364 grams of KBF4 and example 20 had 165 additional grams of KBF4 added to the formulation. Examples 16 and 18 were thermal cured for 7 hours at 230 F. Example 18 also was cured for 2 minutes in a microwave oven. All of the examples in Table 5 easily processed through the Quadro® Comil® using a 45 mil round conical screen with a small round impeller running at 1601 rpm. However, some of the abrasive agglomerate particles generated in example 17 and 20 adhered together after UV curing. As a remedy, the viscosity of the slurry needs to be adjusted upwards so the abrasive agglomerate particles do not stick together. Abrasive articles were made according to the procedure for making rocker drum samples and were tested using the dry Rocker Drum Test. These results are shown in Table 6.

TABLE 5

| Example Number | Mineral Grade/grams | Mineral Type | Premix grams | CH grams | Cab-O-sil grams |
|---|---|---|---|---|---|
| 16 | P-180/2700 | AO | 900 | 2.2 | 15 |
| 17 | P-2000/2000 | AO | 900 | 2.3 |    |
| 18 | P-120/2435 | SiC | 546 | 2.5 | 12 |
| 19 | P-120/3500 | Cer | 900 | 2.2 |    |
| 20 | P-80/2820 | AO | 900 | 2.8 | 15 |

TABLE 6

| Example Number | Rocker Drum Cycles | Cut (grams) | Crush Strength (pounds) |
|---|---|---|---|
| 16 | 1000 | .56 | NA |
|    | 2000 | .63 |    |
|    | 3000 | .61 |    |
|    | 4000 | .56 |    |
|    | 5000 | .48 |    |
| 17 | 1000 | .08 | 7.8 |
|    | 2000 | .08 |    |
|    | 3000 | .06 |    |
|    | 4000 | .06 |    |
|    | 5000 | .06 |    |
| 18 | 1000 | .51 | NA |
|    | 2000 | .48 |    |
|    | 3000 | .43 |    |
| 19 | 1000 | .71 | 10.8 |
|    | 2000 | .71 |    |
|    | 3000 | .72 |    |
|    | 4000 | .72 |    |
|    | 5000 | .72 |    |
| 20 | 1000 | .80 | 8.8 |
|    | 2000 | .56 |    |
|    | 3000 | .34 |    |

Example 17 demonstrates that very small abrasive minerals, grade P-2000, can be processed with formulations described in this invention. Example 20 demonstrates that very large abrasive minerals, grade P-80, can be processed with formulations described in this invention. Examples 18 and 19 demonstrate that other types of minerals can be processed with formulations of this invention.

The abrasive agglomerate particles of example 18 were used to make a coated abrasive belt. The backing used was a 65/35 polyester/cotton open end twill fabric having a base weight of 228 g/m$^2$ (supplied by Millken & Co., Lagrange, Ga.) was dye coated and dried. The cloth was then saturated with a solution of Hycar 2679 acrylic latex (supplied by B. F. Goodrich Corp.) and GP 387-D51 phenolic resin (supplied by Georgia Pacific Co.) to give an 85/15 acrylic/phenolic dried coating weight of 38 g/m$^2$. The twill side is then coated with a solution of Arofene 72155 phenolic resin (supplied by Ashland Co.), #4 clay kaolin and Hycar 1581 nitrile latex (supplied by B. F. Goodrich Co.), to give a 50/35/15 phenolic/clay/nitrile dried coating weight of 38 g/m$^2$. Sixty grains of a conventional calcium carbonate filled water based phenolic make resin was applied and 73 grains of the abrasive agglomerate particles of example 18 were drop coated onto the make coated backing. This was pre-cured for 30 minutes at 175 F. and 90 minutes at 200 F. The pre-cured coating was size coated with 110 grains of 82% solids, water based epoxy resin that contained potassium tetrafluoroborate grinding aid dispersed therein. The size coat was cured for 60 minutes at 175 F. and 120 minutes at 195 F. The cured product was full flexed over a ⅜-inch rod. The full flexed coated abrasive article was converted into 3 inch by 132-inch belts using standard splicing methods. The belts were tested by grinding a 1 inch by 7 inch, titanium workpiece on a Robot using a 14 inch diameter, 1:1 45 degree serration, 90 shore A hardness wheel run at 1,300 RPM at both 5 and 10 pounds normal force. The belts were tested for 20 minutes and cut was recorded at each 60-second interval. The control belt was a 3M P-120 421A commercially available from 3M company St. Paul Minn. The robot test results are shown in Table 7.

TABLE 7

Comparison of titanium grinding results for example 18 coated abrasive belt and a commercially available conventionally coated abrasive belt in grade P-120.

| Sample | Grinding force (Lbs./normal) | Total Cut (grams) | Total Cut (%) |
|---|---|---|---|
| P-120 3M421A | 3.8–5.5 | 21.4 | 100 |
| Example 18 | 3.8–5.5 | 29.7 | 139 |
| P-120 3M421A | 9.0–11 | 39.4 | 100 |
| Example 18 | 9.0–11 | 67.0 | 170 |

The robot grinding results shown in Table 7 show that the belts made with the abrasive agglomerate particles of the present invention remove more titanium than a conventional abrasive belt at two typical grinding forces. For the construction tested, the abrasive article of the present invention performed better (removed more titanium) when the normal force was higher.

EXAMPLES 21–23

Example 21 was made as follows: a uniform coating of a 52:48 by weight calcium carbonate filled phenolic make resin was applied to a 50VX backing on an Accu-Lab™ draw-down apparatus (supplied by Paul N. Gardner Co., Pompano Beach, Fla.) using a #60 wire-wound rod to give a coating weight of 676 g/m$^2$; the 50VX backing is described as a 35/19 20/28 100% cotton twill 2/1 backing, with a base weight of 390–400 g/m$^2$, supplied by Vereingte Schmirgel und Maschinen Fabriken AG, Hanover, Germany; the abrasive agglomerate particles were poured onto the wet make resin and rolled back and forth several times to provide a fully loaded, evenly distributed, coating of abrasive agglomerate particles on the backing. Excess abrasive agglomerate particles were shaken off and the coated material heated in a forced air oven at 180° F. (82° C.) overnight. A 52:48 by weight calcium carbonate-filled phenolic size resin was then applied uniformly by hand with a paint brush. Sized samples were heated for 1 hour at 180° F. (82° C.), and then cured for two hours at 200° F. (93° C.), followed by 30 minutes at 220° F. (104° C.) and one hour at 245° F. (118° C.). After curing the coated abrasive samples were flexed over a 2″ (5 cm) diameter bar. Example 22 was made according to example 21 except for using a #36 wire-wound rod to give a make resin coating weight of 493 g/m$^2$. Example 23 was made according to example 21 except for using a #52 wire-wound rod to apply the make resin, to give a coating weight of 614 g/m$^2$.

Examples 21–23 were run to show that conventional phenolic based make and size resins can be used with the abrasive agglomerate particles to bind them to a cloth backing to make an abrasive article. The abrasive agglomerate particles were made the same as example 19. The dry Rocker Drum test results are shown in Table 8. The results in Table 8 compare favorably with the comparative example A for both cut rate and life. These results indicate that the abrasive agglomerate particles can be used with many combinations of traditional abrasive make and size resin systems as well as radiation curable make and size resin systems.

TABLE 8

| Example Numbers | Rocker Drum cycles | Cut (grams) |
|---|---|---|
| 21 | 1000 | .68 |
| | 2000 | .72 |
| | 3000 | .68 |
| | 4000 | .66 |
| | 5000 | .59 |
| | 6000 | .55 |
| | 7000 | .50 |
| 22 | 1000 | .70 |
| | 2000 | .63 |
| | 3000 | .72 |
| | 4000 | .67 |
| | 5000 | .62 |
| | 6000 | .54 |
| | 7000 | .42 |
| 23 | 1000 | .68 |
| | 2000 | .72 |
| | 3000 | .70 |
| | 4000 | .68 |
| | 5000 | .64 |
| | 6000 | .58 |
| | 7000 | .56 |
| | 8000 | .52 |

EXAMPLES 24–27

Examples 24–27 were prepared to demonstrate the versatility of this invention. These examples were made by the same general process as that used to make example 11. Example 24 had 2160 g of premix in Table 1A, 6 g CH, 28.8 g M5 and 6450 g P-180 AO and was mixed in a 5 quart Hobart mixer on speed one. Example 25 had 680 g of premix in Table 1, 1.8 g CH, 2770 g P-120 AO and 274 g PC. Example 26 had 680 g of premix in Table 1, 1.8 g CH, 2590 g P120 AO and 457 g P-180 green silicon carbide. Example 27 had 1188 grams of SR351, 12 grams of KB1 and 5000 g of 0.5 micron cerium oxide. The crush strength of the abrasive agglomerate particles made in examples 24–27 are shown in Table 9. These examples were further cured in an oven for 6 hours at 350 F. except examples 25 and 26, which were further cured in a vacuum oven at 24 inches of Mercury for one hour. Table 9 shows the crush strength of examples 24–27.

TABLE 9

| Example Number | Crush Strength (pounds) |
|---|---|
| 24 | 16.2 |
| 25 | 1.9 |
| 26 | 6.0 |
| 27 | 10 |

EXAMPLES 28–31

Example 28 was run to demonstrate that another type of machine can be used to force a composition through a perforated substrate to make the abrasive agglomerate precursor particles of the present invention. The abrasive agglomerate particles of example 28 were prepared by thoroughly mixing 2160 g of the premix composition in Table 1 with 6 grams CH and 8280 grams of P-120 AO mineral under low shear. The slurry was processed through a wiper bar rotor sizing screen machine equipped with a 65 mil round opening and a 1/16 inch gap between the screen and the wiper blade. The abrasive agglomerate precursor particles formed were collected in a tray and irradiated with a 600 watt Fusion D bulb lamp at 30 FPM to provide abrasive agglomerate particles. The abrasive agglomerate particles were further cured in a thermal oven for 6 hours at 350 F. The crush strength of the cured filament was 15.9 pounds.

Examples 29 and 30 were run to show that other thermal initiators could be used to further cure the abrasive agglomerate particles, made by the present invention, in a thermal oven. The slurry formulation was the same as that in example 28 except example 29 used 6 grams of Vazo 52 and example 30 used 6 grams of Perkadox 16S instead of the CH initiator used in example 28. The slurry was processed through the Quadro® Comil® using a 45 mil round screen, a solid impeller running at 350 RPM, a collar and a 0.225 mil spacer. After irradiation, the abrasive agglomerate particles were further cured in a thermal oven for 6 hours at 350 F. The crush strength for example 29 was 15 pounds and 11 pounds for example 30.

Example 31 was made according to the process for example 29 except that the abrasive agglomerate particle was further cured in hot water (195 F.) for 1 hour. The crush strength of the further cured abrasive agglomerate particle was 11 pounds. This example shows that sources of thermal energy, other than ovens, can be used in further curing steps.

EXAMPLES 32 and 33

Inorganic aggregate precursor agglomerate particles were made in examples 32 and 33. Slurries were prepared as described in the "General procedure for making agglomerate precursor particles slurry," using grade #60 AG321 abrasive grain and SGP glass powder. The slurry formulation is listed in Table 10.

TABLE 10

| Material | Example 32 Quantity (g) | Example 33 Quantity (g) |
| --- | --- | --- |
| TMPTA | 891 | 594 |
| KB1 | 9.0 | 6.0 |
| CH | 4.0 | 4.0 |
| SGP | 2120 | 1509 |
| #60 AG321 | 3180 | 4527 |
| Total inorganic solids content | 86 wt % | 91 wt % |

The SGP and AG321 were premixed by hand in a plastic container then added slowly into the resin mixture of TMPTA, KB1, and TH1. A 12-quart Hobart mixer, Model A120T was used with a flat beater rotor. The mixer was run at the slowest speed setting during addition of the SGP/AG321 mixture. The speed was then increased to "medium" after all ingredients were added, and mixing was continued for 25 minutes. The final temperature of the mixtures was in the range of approximately 100° F. (38° C.) to 120° F. (49° C.).

Inorganic aggregate precursor agglomerate particles were made as described in the "General procedure for making agglomerate particles." The Quadro® Comil® was set up with a small round impellar at 0.075" (1.9 mm) spacing, and conical screen with 0.062" (1.6 mm) round, grater-type holes, and the drive motor speed was set at 470 rpm. After the inorganic aggregate precursor agglomerate particles were made according to the present invention, they were placed in aluminum pans and further cured in a forced-air oven for 6 hours at 350° F. (177° C.). The aggregate precursor agglomerate particles were resized with one additional pass through the Quadro® Comil® using a 0.075" (1.90 mm) spacer and a 0.094" (2.39 mm) grater screen. The resized particles were screened, and the size fraction that passed through a #24 mesh screen (−24 mesh) was separated from the fraction that was retained on a #24 mesh screen (+24 mesh). The +24 mesh particle fraction was collected, and the strength of the aggregate precursor agglomerate particles was measured using the Crush Test.

The average crush strength for particles of example 32 was 20.2 lbs. The average crush strength for particles of example 33 was 11.4 lbs.

We claim:

1. A method for making abrasive agglomerate particles comprising the steps of:
   a) forcing a composition comprising a radiation curable polymerizable binder precursor and a plurality of abrasive grains through a perforated substrate to form abrasive agglomerate precursor particles;
   b) separating the abrasive agglomerate precursor particles from the perforated substrate; and
   c) irradiating the abrasive agglomerate precursor particles, wherein radiation energy is transmitted from a radiation energy source to the abrasive agglomerate precursor particles to at least partially cure the binder precursor to provide abrasive agglomerate particles, and wherein the process components in steps a), b), and c) are spatially oriented in a vertical and consecutive manner.

2. A method according to claim 1, wherein the abrasive agglomerate particles are collected after the irradiation step.

3. A method according to claim 1, wherein the irradiation step comprises a step of passing the abrasive agglomerate precursor particles into a first curing zone that contains the radiation source.

4. A method according to claim 1, wherein the abrasive agglomerate particles are passed through a second curing zone, wherein energy is transmitted from an energy source to the abrasive agglomerate particles to further cure the abrasive agglomerate particles.

5. A method according to claim 1, wherein the binder precursor comprises epoxy resins, acrylated urethane resins, acrylated epoxy resins, ethylenically unsaturated resins, aminoplast resins having pendant unsaturated carbonyl groups, isocyanurate derivatives having at least one pendant acrylate group, isocyanate derivatives having at least one pendant acrylate group or combinations thereof.

6. A method according to claim 1, wherein the abrasive agglomerate particles are filamentary shaped and have a length ranging from about 10 to about 1500 micrometers.

7. A method according to claim 6, wherein the length of the abrasive agglomerate particles is in a range from about 20 to about 800 micrometers.

8. A method according to claim 7, wherein the length of the abrasive agglomerate particles is in a range from about 50 to about 400 micrometers.

9. A method according to claim 1, wherein the abrasive agglomerate precursor particles further comprise a modifying additive selected from the group consisting of diluent, antistatic agent, lubricant, pigment, suspending agent, coupling agent, grinding aid, filler, inorganic binder precursor, surfactant, and a combination thereof.

10. A method according to claim 1, wherein the step of forcing the composition through the perforated substrate to form the abrasive agglomerate precursor particles comprises methods of extrusion, milling, or calendering.

11. A method according to claim 1, wherein the radiation source comprises electron beam, ultraviolet light, visible light, laser light or combinations thereof.

12. A method according to claim 3, wherein the radiation source comprises electron beam, ultraviolet light, visible light, laser light or combinations thereof.

13. A method according to claim 4, wherein the energy source comprises electron beam, ultraviolet light, visible light, microwave, laser light, thermal or combinations thereof.

14. A method according to claim 1, wherein steps (a), (b), and (c) are performed sequentially and continuously.

15. A method according to claim 10, wherein steps (a), (b), and (c) are performed sequentially and continuously.

16. A method according to claim 1, wherein the plurality of abrasive grains comprise from 5 to 95% by weight of the composition.

17. A method according to claim 15, wherein the plurality of abrasive grains comprise from 40 to 95% by weight of the composition.

18. A method according to claim 1, wherein said composition is 100% solids.

19. A method according to claim 1, wherein a size reduction step is performed on the abrasive agglomerate particles after the irradiation step.

20. A method according to claim 4, wherein a size reduction step is performed on the abrasive agglomerate particles after being passed through the second curing zone.

21. A method according to claim 20, wherein the size reduction step comprises the methods of milling, crushing and tumbling.

22. A method according to claim 19, wherein the size reduction step comprises the methods of milling, crushing and tumbling.

23. A method according to claim 1, wherein said abrasive grains comprise fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, or combinations thereof.

* * * * *